Nov. 25, 1969 P. J. M. LALLEMANT 3,480,115

DISC BRAKES

Filed March 19, 1968 3 Sheets-Sheet 1

United States Patent Office 3,480,115
Patented Nov. 25, 1969

3,480,115
DISC BRAKES
Pierre Joseph Martin Lallemant, Port-Marly, France, assignor to Societe Hispano-Suiza-Lallemant, Bois-Colombes, France
Filed Mar. 19, 1968, Ser. No. 714,300
Claims priority, application France, Mar. 22, 1967, 99,819
Int. Cl. F16d 55/224, 65/84
U.S. Cl. 188—72 6 Claims

ABSTRACT OF THE DISCLOSURE

The brake comprises two groups of coaxial discs, namely a first group of discs not equipped with friction linings and a second group of discs equipped with friction linings. The discs of one group are disposed alternately with the discs of the other group. The discs of one group are angularly fixed on a rotating structure and the discs of the other group, on a non-rotating structure, of the brake. Control means are provided to apply the discs of these two groups against each other. The discs of at least one of the two groups have thicknesses that vary from one disc to another according to the axial position of the disc.

The present invention relates to multiple disc brakes which comprise two groups of coaxial discs disposed in an alternate manner (one disc of one of the groups, one disc of the other group, etc. . . .), namely, a first group comprising discs not equipped with friction linings, the discs of this first group being angularly fixed on a structure of the brake that is generally, and as supposed hereafter, a rotating structure, each of the discs of the first group being called hereafter "smooth rotor," and a second group comprising discs equipped with friction linings, the discs of this second group being angularly fixed on a structure of the brake which is then a non-rotating structure, each of the discs of the second group being called hereafter "lined stator," these smooth rotors and lined stators being mounted, respectively on the rotating structure and on the non-rotating structure—since it has been supposed that the discs of the first group are angularly fixed on a rotating structure—free in translation so that they can, under the action of appropriate control means, be applied one against the other to generate a braking torque between the rotating structure and the non-rotating structure.

Of course, the invention also encompasses the case in which the discs of the first group—not equipped with friction linings—are angularly fixed on a non-rotating structure and the discs of the second group—equipped with friction linings—are fixed on a rotating structure, these discs being then mounted, respectively on the non-rotating structure and on the rotating structure, free in translation so that they can, under the action of appropriae control means, be applied one against the other to generate a braking torque between the non-rotating structure and the rotating structure.

It is appropriate to mention that each of the discs of the first group—not equipped with friction linings—can be formed of a single piece or of adjacent sectors connected to each other; such discs can possibly comprise, on their lateral faces, added parts of a material different from the material forming the disc proper.

Similarly, it is appropriate to mention that each of the discs of the second group—equipped with friction linings—can be formed of a single piece or of adjacent sectors connected to each other.

The invention is more particularly, but not exclusively, concerned with multiple disc brakes for aviation wheels.

In the brakes of the type in question, the smooth rotors and the lined stators are brought to very high temperatures when the control means are actuated.

Due to the conception of these brakes, the intensity of the cooling of the smooth rotors and of the lined stators varies according to their axial position in the brake.

Moreover, when the control means are actuated, they generate between each smooth rotor and the successive lined stator specific pressures which depend on the axial position in the brake of this smooth rotor and this lined stator since the control means can act on the unit formed by all the discs solely by one and/or the other of the ends of this unit.

The working conditions (temperature and specific pressure) of the different smooth rotors and of the different lined stators of these brakes thus vary according to their axial position in the brake, which results, On the one hand, in a different degree of wear of the lateral faces of each of these smooth rotors, And on the other hand, in a different degree of wear for the friction linings of each of these lined stators.

Prior to this invention, the discs of the two groups that the brakes of the type in question comprised—smooth rotors and lined stators—were such that the smooth rotors all had a common thickness (with respect with each other), and the lined stators all had a common thickness (with respect to each other).

With regard to the smooth rotors, it was noticed that, after a certain time of operation, the lateral faces of each of these smooth rotors were worn all the more as the working conditions of these smooth rotors were harder.

During maintenance operations on these brakes, the smooth rotors were generally re-machined, this re-machining consisting principally in the removal of material from at least one of the two faces of each of these smooth rotors. Thus, after each maintenance operation, smooth rotors whose thickness had been decreased by their re-machining were remounted in the brakes. Finally, each maintenance operation resulted in a decrease of the overall thermal capacity of the brakes which, accordingly, heated up more rapidly and could assure only a reduced braking efficiency after a certain time of operation.

With regard to the lined stators, it was noticed that, after a certain time of operation, the friction linings of each of these lined stators were all the more worn as the working conditions of these lined stators were harder.

During maintenance operations on these brakes, generally the friction linings of all the lined stators were replaced when the friction linings of the lined stator subjected to the hardest working conditions could be considered as completely worn out, the friction linings of the other lined stators being then only partially worn. Finally, each maintenance operation resulted in a loss of a part of the material forming the friction linings of all of the lined stators of these brakes.

The chief object of the present invention is to provide multiple disc brakes that fulfill the requirements of practice, in particular with respect to their longevity, the uniformity of their braking efficiency and the conditions in which the maintenance operations can be carried out.

A disc brake according to the present invention is characterized by the fact that the discs of at least one of the two groups of discs, that is to say the smooth rotors and/or the lined stators, have respective thicknesses that vary from one disc to the next disc of the same group, according to the axial position of the disc in the brake. Generally, the respective thicknesses are greater, and hence have a greater thermal capacity, as the operating temperature of the disc considered is higher, and/or as the specific pressure between one smooth rotor and the successive lined stator is higher.

Due to this feature,

On the one hand, the degrees of wear of the lateral faces of the smooth rotors are approximately the same after a certain time of operation, whatever be their axial position in the brake, which permits, in particular, after re-machining of these smooth rotors, each smooth rotor (with the exception of the smooth rotor of smallest thickness) to be given a new axial position in the brake, for which new axial position the reduced thickness that has just been given to the smooth rotor is adapted to the working conditions corresponding to this new axial position, And on the other hand, the degrees of wear of the friction linings of the lined stators are approximatively the same after a certain time of operation, whatever be their axial position, which permits, in particular, during the replacement of the friction linings of these lined stators, an overall replacement of the friction linings, all of which can be considered as completely worn out.

Preferred embodiments of the invention will now be described, merely by way of example, with reference to the accompanying drawings in which.

The particular embodiments of the invention that are now going to be described, each relates to a multiple disc brake for an aviation wheel.

Figure 1:
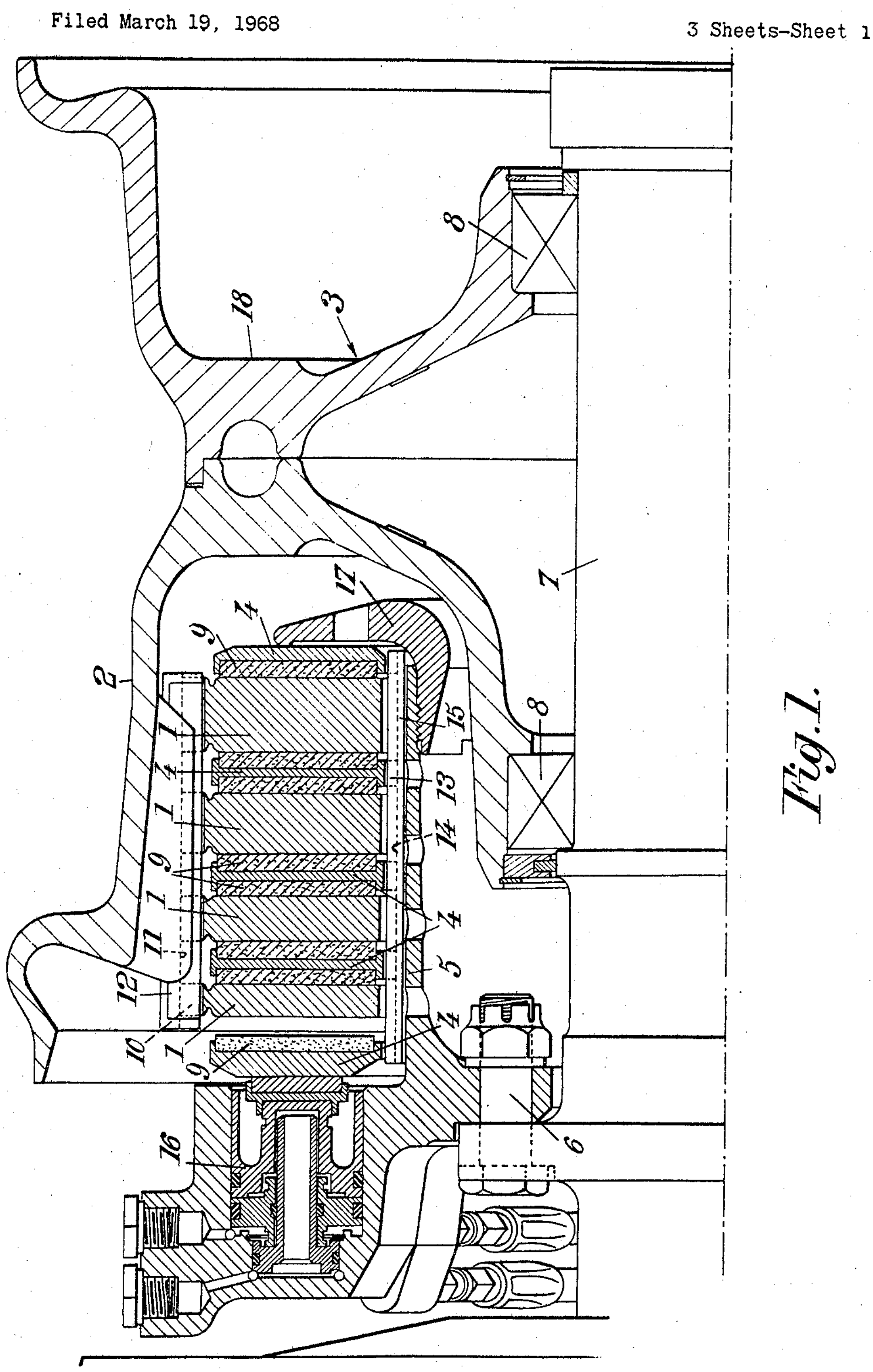
FIGURES 1 and 2 show respectively, in axial half-section, two types of wheels equipped with multiple disc brakes constructed according to two embodiments of the invention.
Figure 2:
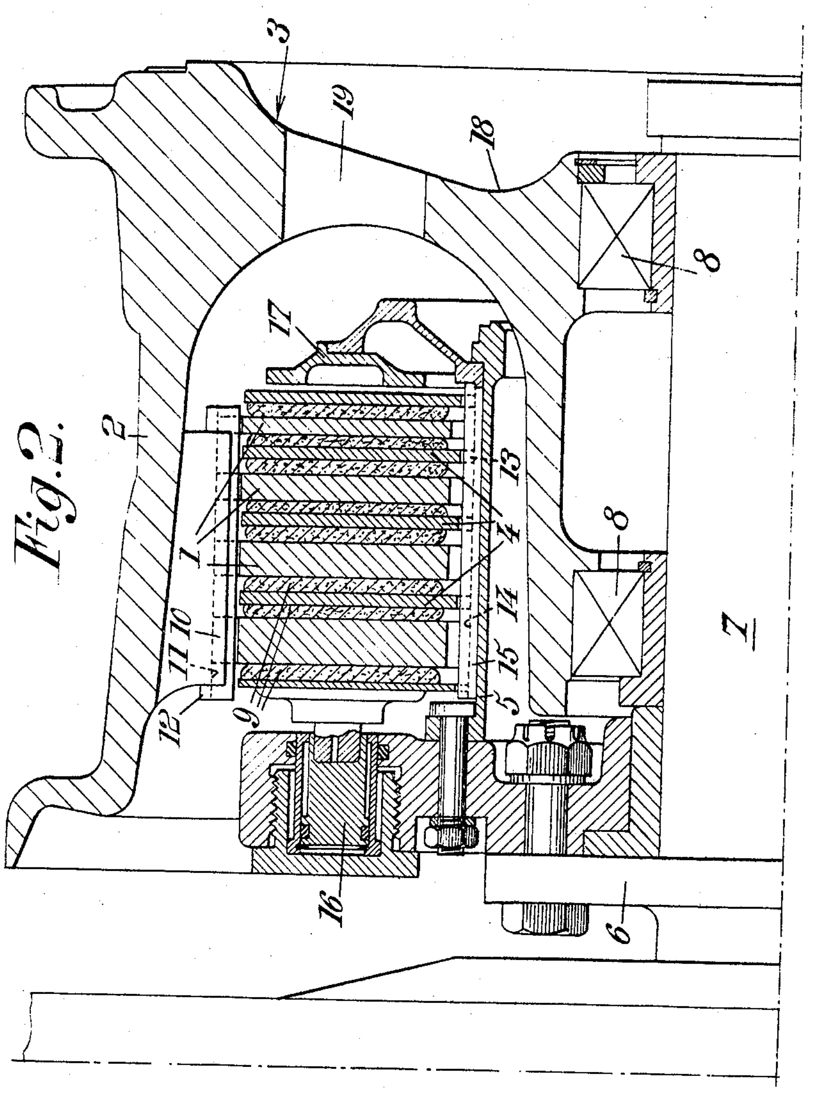
Figure 3:
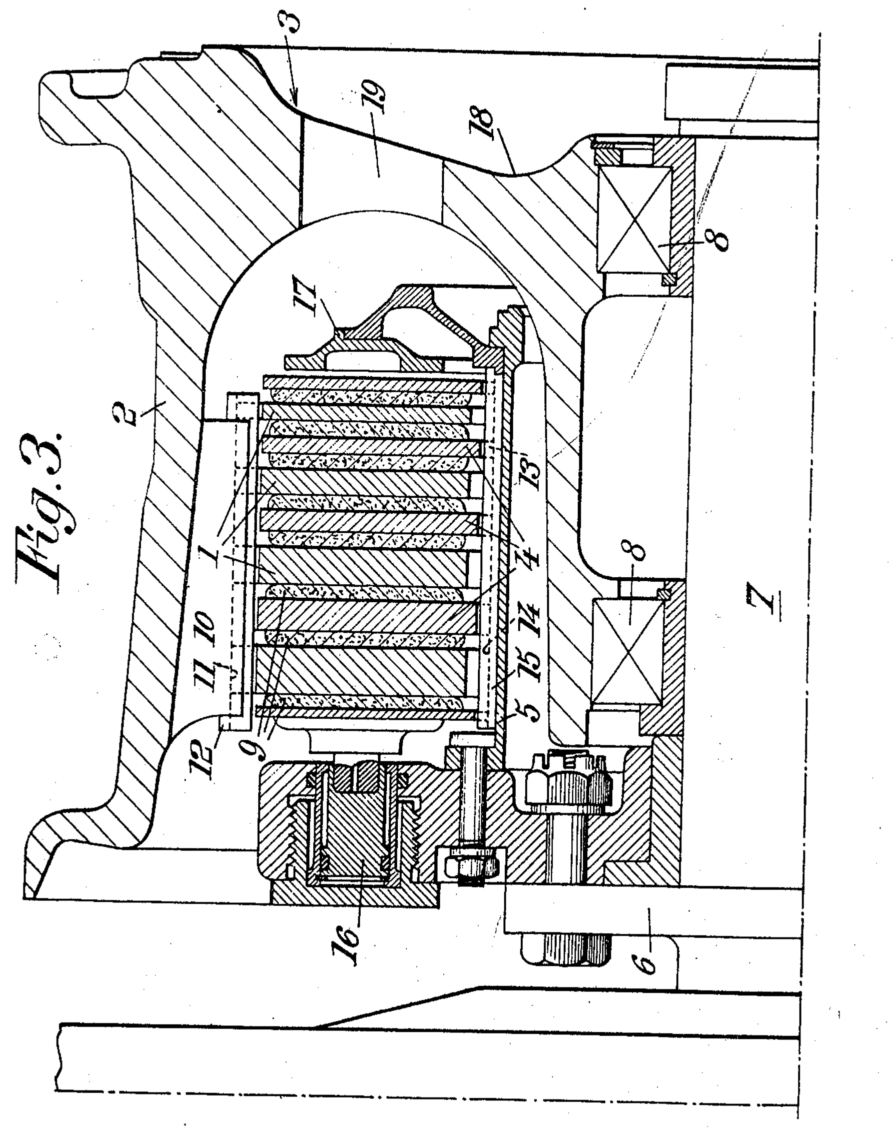
FIGURE 3 is an axial half-section of a wheel of the same type as that shown in FIGURE 2, but equipped with a multiple disc brake constructed according to another embodiment of the invention.

This brake comprises, as shown in FIGURES 1, 2 and 3, two groups of coaxial discs disposed in an alternate manner (one disc of one of the groups, one disc of the other group, etc. . . .), namely, A first group comprising smooth rotors 1, that is to say discs not equipped with friction linings, these smooth rotors 1 being angularly fixed on a rotating structure of the brake, this rotating structure advantageously comprising the rim 2 of the aviation wheel 3, And a second group comprising lined stators 4, that is to say discs equipped with friction linings 9, these lined stators 4 being angularly fixed on a non-rotating structure of the brake, this non-rotating structure advantageously comprising a torsion tube 5 fixed on a flange 6 rigid with a stub axle 7 on which the wheel 3 is mounted with the interposition of bearings 8.

The smooth rotors 1 are mounted free in translation on the rim 2 of the wheel 3, these smooth rotors 1 comprising for this purpose lugs 10 co-operating with grooves 11 of axial direction, each groove 11 being formed in an added piece 12 rigid with the rim 2.

The lined stators 4 are mounted free in translation on the torsion tube 5, these lined stators 4 comprising for this purpose lugs 13 co-operating with grooves 14 of axial direction, each groove 11 being formed in an added piece 15 rigid with the torsion tube 5.

Control means are provided for applying the smooth rotors 1 and the lined stators 4 one against the other to generate a braking torque between the rim 2 of the wheel 3 and the torsion tube 5.

These control means comprise principally control pistons 16 actuated by a liquid under pressure and, preferably, regularly distributed circumferentially. These control pistons 16 are disposed at the end of the unit formed by all the discs which end is located towards the exterior of the wheel 3, whereas the end of this unit which is located at the interior of the wheel 3 bears against a retaining plate 17 rigid with the torsion tube 5.

The discs of at least one of the two groups of discs, that is to say the smooth rotors 1 and/or the lined stators 4, instead of having a common thickness (common to all the discs of that group), have respective thicknesses that vary according to the axial position of the discs in the brake. The discs in question have respective thicknesses that are greater, whereby the thermal capacities of the discs are greater, as the operating temperature of the disc considered is higher, and/or as the specific pressure between one smooth rotor 1 and the successive lined stator 4 is higher.

It will then be appreciated that,

On the one hand, the degrees of wear of the lateral faces of the smooth rotors 1 are approximately the same after a certain time of operation, whatever be their axial position in the brake, which permits, in particular, after re-machining of these smooth rotors 1, each smooth rotor 1 (with the exception of the smooth rotor 1 of the smallest thickness) to be given a new axial position in the brake, for which new axial position the reduced thickness that has just been given to that smooth rotor 1 is adapted to the working conditions corresponding to this new axial position, And on the other hand, the degrees of wear of the friction linings 9 of the lined stators 4 are approximately the same after a certain time of operation, whatever be their axial position, which permits, in particular, during replacement of the friction linings 9 of these lined stators 4, an overall replacement of the friction linings 9, all of which can be considered as completely worn out.

For this purpose, in the embodiments of FIGURES 1 and 2, it is the smooth rotors 1 that have greater respective thicknesses as the operating temperature of the disc considered is higher and/or as the specific pressure between one smooth rotor 1 and the successive lined stator 4 is higher.

The brake represented in FIGURE 1 is a brake for a "closed" aviation wheel 3, that is to say, a wheel whose side 18 does not comprise any ventilation openings, this brake comprising four smooth rotors 1.

In such a brake,

The intensity of the cooling of the smooth rotors 1 decreases from the smooth rotor 1 situated towards the control pistons 16 to the smooth rotor 1 situated towards the retaining plate 17, And the specific pressures exerted between one smooth rotor 1 and the successive lined stator 4 decrease from the smooth rotor 1 situated towards the control pistons 16 to the smooth rotor 1 situated towards the retaining plate 17.

However, in this embodiment, the effect of temperature is preponderant over the effect of pressure. In these conditions, the smooth rotors 1 of this brake are given thicknesses that increase regularly from the smooth rotor 1 situated towards the control pistons 16 to the smooth rotor 1 situated towards the retaining plate 17.

The brake represented in FIGURE 2 is a brake for an "open" aviation wheel 3, that is to say a wheel whose side 18 comprises ventilation openings 19, this brake comprising four smooth rotors 1.

In such a brake,

The intensity of the cooling of the smooth rotors 1 decreases from the smooth rotor 1 situated towards the control pistons 16 to the smooth rotor 1 situated in the middle of the brake and then increases to the smooth rotor 1 situated towards the retaining plate 17, And the specific pressures exerted between one smooth rotor 1 and the successive lined stator 4 decrease from the smooth rotor 1 situated towards the control pistons 16 to the smooth rotor 1 situated towards the retaining plate 17.

For the part of the brake situated between the control pistons 16 and the middle of the brake, the effect of the specific pressure preponderant over the effect of cooling. In these conditions, the smooth rotors 1 of this brake are given thicknesses that decrease regularly from the smooth rotor 1 situated towards the control pistons 16 to the smooth rotor 1 situated towards the retaining plate 17.

In the embodiment of FIGURE 3, both the smooth rotors 1 and the lined stators 4 have greater respective thicknesses as the operating temperature of the disc considered is higher and/or as the specific pressure between one smooth rotor 1 and the successive lined stator 4 is higher.

The brake represented in FIGURE 3 is, as in the case of FIGURE 2, a brake for an "open" aviation wheel 3, that is to say a wheel whose side 18 comprises ventilation openings 19, this brake comprising four smooth rotors 1 and three lined stators 4 each of which is interposed between two smooth rotors 1.

In such a brake,

The intensity of the cooling of the smooth rotors 1 and of the lined stators 4 decreases from the smooth rotor 1 situated towards the control pistons 16 to the smooth rotor 1 situated in the middle of the brake and then increases to the smooth rotor 1 situated towards the retaining plate 17, And the specific pressures exerted between on smooth rotor 1 and the successive lined stator 4 decrease from the smooth rotor 1 situated towards the control pistons 16 to the smooth rotor 1 situated towards the retaining plate 17.

In the brake of FIGURE 3, as is the case in the brake of FIGURE 2, the effect of the specific pressure is preponderant over the effect of the cooling for the part of the brake situated between the control pistons 16 and the middle of the brake. In these conditions, The smooth rotors 1 of this brake are given thicknesses that decrease regularly from the smooth rotor 1 situated towards the control pistons 16 to the smooth rotor 1 situated towards the retaining plate 17, And the lined stators 4 of this brake are given thicknesses that decrease regularly from the lined stator 4 situated towards the control pistons 16 to the lined stator 4 situated towards the retaining plate 17.

Whatever embodiment is adopted, the present invention provides a multiple disc brake, applicable to an aviation wheel, that has a certain number of advantages among which the following can be summarized in particular:

The degrees of wear of the smooth rotors are approximately the same after a certain time of operation, whatever be their axial position in the brake, It is possible, after re-machining the smooth rotors, to give each smooth rotor (with the exception of the smooth rotor of smallest thickness) a new axial position in the brake, for which new axial position the reduced thickness that has just been given to this smooth rotor is adapted to the working conditions corresponding to this new position, The brake according to the present invention has an overall thermal capacity which is not affected by remachining the smooth rotors, and hence the efficiency of such a brake is constant, The degrees of wear of the friction linings of the lined stators are approximately the same after a certain time of operation, whatever be their axial position, which permits in particular, during the replacement of the friction linings of these lined stators, an overall replacement of the friction linings, all of which can be considered as completely worn out, The brake according to the present invention can provide a more durable service than a conventional brake, For the same braking efficiency, the brake according to the present invention can be lighter than a conventional brake.

The present invention should not be limited to the various multiple disc brakes specifically described hereabove, as various modificatios are possible without departing from the spirit or scope of the invention.

What I claim is:

1. A multiple disc brake which comprises, a rotating structure and a non-rotating structure, two groups of coaxial discs, namely a first group comprising more than two first discs axially movable and not equipped with friction linings, and a second group comprising second discs axially movable and equipped with friction linings, said first discs being disposed alternately with said second disc, and said first discs each having two opposed friction surfaces and working by friction on both said friction surfaces during braking, the discs of one of these two groups being angularly fixed on said rotating structure of the brake, and the discs of the other group being angularly fixed on said non-rotating structure of the brake, control means for applying the discs of these two groups axially one against the other in order to generate a braking torque between said rotating structure and said non-rotating structure.

at least said first discs having respective thicknesses that vary from one disc to another according to the axial position of the disc, and hence according to the working conditions of the disc, these thicknesses increasing with increasing hardness of the working conditions.

2. A multiple disc brake according to claim 1, for an aviation wheel, wherein said first discs are angularly fixed on said rotating structure, and said second discs are angularly fixed on said non-rotating structure.

3. A multiple disc brake according to claim 2, for an aviation wheel having a side that does not comprise any ventilation openings, wherein said two groups of alternating discs form a unit having a first end and a second end, said first end being located towards the exterior of said wheel, and said second end being located towards the interior of said wheel, said control means comprise control pistons disposed at and adapted to bear against said first end of said unit, a retaining plate is disposed at and adapted to bear against said second end of said unit, and the respective thicknesses of said first discs increase regularly from the first disc situated towards said control pistons to the first disc situated towards said retaining plate.

4. A multiple disc brake according to claim 2, for an aviation wheel having a side that comprises ventilation openings, wherein said two groups of alternating discs form a unit having a first end and a second end, said first end being located towards the exterior of said wheel, and said second end being located towards the interior of said wheel, said control means comprise control pistons disposed at and adapted to bear against said first end of said unit, a retaining plate is disposed at and adapted to bear against said second end of said unit, and the respective thicknesses of said first discs decrease regularly from the first disc situated towards said control pistons to the first disc situated towards said retaining plate.

5. A multiple disc brake according to claim 1, for an aviation wheel, wherein said first discs are angularly fixed on said rotating structure, and said second discs are angularly fixed on said non-rotating structure, and said first discs and said second discs have respective thicknesses that vary from one disc to another of the same group according to the axial position of the disc, and hence according to the working conditions of the disc, the thickness in each group increasing with increasing hardness of the working conditions.

6. A multiple disc brake according to claim 5, for an aviation wheel having a side that comprises ventilation openings, wherein said two groups of alternating discs form a unit having a first end and a second end, said first end being located towards the exterior of said wheel, and said second end being located towards the interior of said wheel, said control means comprise control pistons disposed at and adapted to bear against said first end of said unit, a retaining plate is disposed at and adapted to bear against said second end of said unit, the respective thicknesses of said first discs decrease regularly from the first disc situated towards said control pistons to the first disc situated towards said retaining plate, and the respective thicknesses of said second discs decrease regularly from the second disc situated towards said control pistons to the second disc situated towards the retaining plate.

References Cited

UNITED STATES PATENTS

| | | | |
|---|---|---|---|
| 2,417,855 | 3/1947 | Barish | 188—72 |
| 3,348,642 | 10/1967 | Kosche | 188—251 |
| 3,357,521 | 12/1967 | Lallemant | 188—72 |

FOREIGN PATENTS

| | | |
|---|---|---|
| 1,227,217 | 3/1960 | France. |

GEORGE E. A. HALVOSA, Primary Examiner

U.S. Cl. X.R.

188—264; 192—70.2, 113